Figure 1:
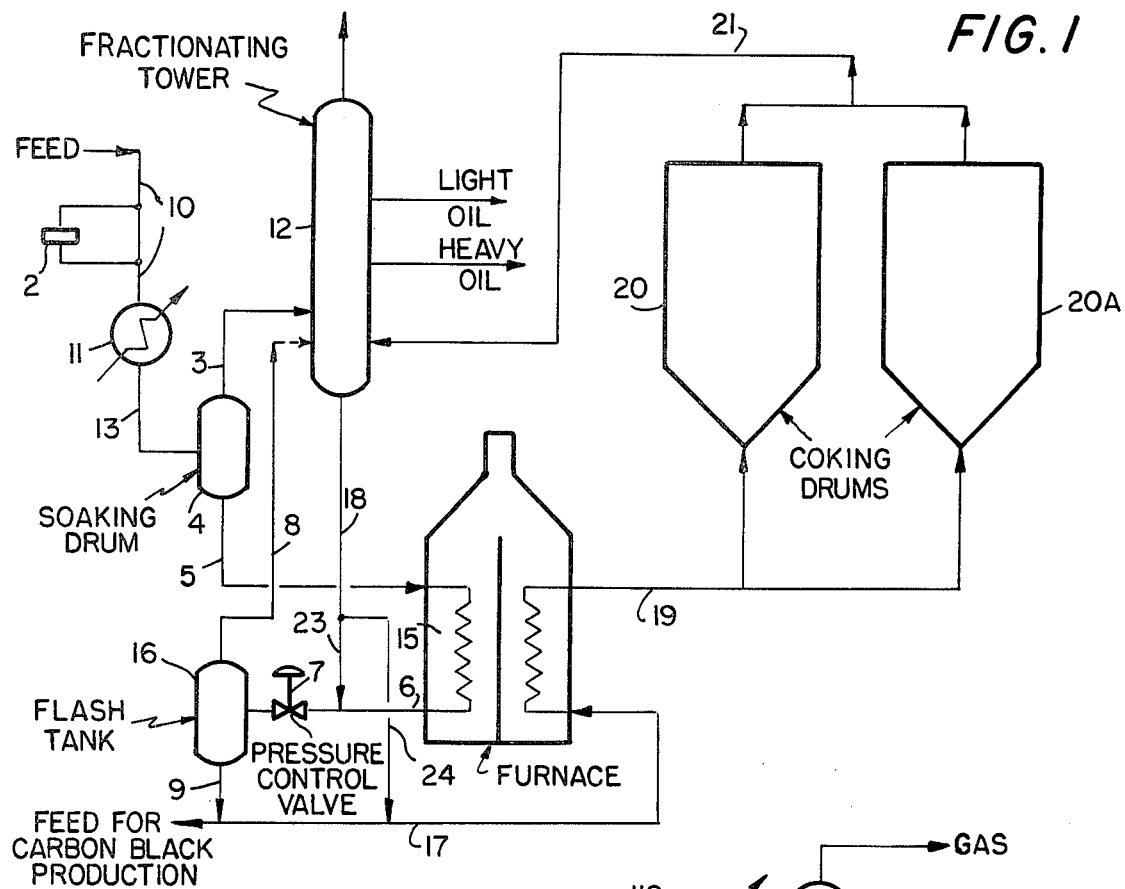

United States Patent [19]

Sze et al.

[11] 4,199,434
[45] Apr. 22, 1980

[54] FEEDSTOCK TREATMENT

[75] Inventors: Morgan C. Sze, Upper Montclair; Thomas M. Bennett, Scotch Plains; Harold Unger, Fort Lee, all of N.J.

[73] Assignee: The Lummus Company, Bloomfield, N.J.

[21] Appl. No.: 876,882

[22] Filed: Feb. 13, 1978

Related U.S. Application Data

[63] Continuation of Ser. No. 668,752, Mar. 2, 1976, abandoned, which is a continuation-in-part of Ser. No. 514,356, Oct. 15, 1974, abandoned.

[51] Int. Cl.² ............................ C09C 1/48; C10C 9/14
[52] U.S. Cl. ........................................... 208/40; 208/42; 208/44; 208/50; 208/131; 423/450
[58] Field of Search ..................... 208/40, 46, 50, 106, 208/125, 131, 44, 42; 423/450

[56] References Cited

U.S. PATENT DOCUMENTS

| | | | |
|---|---|---|---|
| 3,472,761 | 10/1969 | Cameron | 208/131 |
| 3,537,976 | 11/1970 | Alexander et al. | 208/40 |
| 3,547,804 | 12/1970 | Noguchi et al. | 208/131 |
| 3,687,840 | 8/1972 | Sze et al. | 208/131 |
| 3,759,822 | 9/1973 | Folkins | 208/131 |
| 3,794,579 | 2/1974 | Enomoto et al. | 208/131 |
| 3,959,115 | 5/1976 | Hayashi et al. | 208/131 |

*Primary Examiner*—Herbert Levine
*Attorney, Agent, or Firm*—Louis E. Marn; Elliot M. Olstein

[57] ABSTRACT

A pyrolysis fuel oil is treated by soaking in the presence of sulfur for a period of time sufficient to react the highly unsaturated compounds present in the oil, followed by heating the soaked fuel oil at a temperature of from 850° F. to 1100° F. and an outlet pressure of from 300 to 600 psig to provide a treated feed having an API gravity of −3° or less. The feed may be employed for the production of needle coke and/or carbon black and/or electrode binder pitch.

12 Claims, 2 Drawing Figures

U.S. Patent

Apr. 22, 1980

4,199,434

FEEDSTOCK TREATMENT

This is a continuation of application Ser. No. 668,752, filed Mar. 2, 1976, now abandoned. Said application Ser. No. 668,752 is a continuation-in-part of U.S. application Ser. No. 514,356, filed on Oct. 15, 1974, now abandoned.

This invention relates to the treatment of feedstocks, and more particularly, to the treatment of a pyrolysis fuel oil. This invention further relates to the use of a pyrolysis fuel oil for the production of coke and/or carbon black and/or carbon electrode binder pitch.

Pyrolysis fuel oil is a suitable feedstock for the production of coke. In U.S. Pat. No. 3,687,840, a process is described which overcomes the problem of plugging in the use of pyrolysis fuel oil for the production of coke by a delayed coking process. In accordance with the process of the aforesaid patent, there is provided the following steps: (a) addition of sulfur to the pyrolysis fuel oil prior to its introduction into a soaking tank; (b) maintenance of the pyrolysis fuel oil at above 450° F. for at least five (5) minutes in the soaking tank before it is passed to the coking heater; and (c) operation of the heater coil outlet and coke drum at a pressure of not less than 40 psig.

While the process of U.S. Pat. No. 3,687,840 is successful in overcoming the disadvantageous plugging problems, it has been found that it is difficult to produce a product having consistent quality from such a feedstock.

An object of the present invention is to provide for the treatment of pyrolysis fuel oils.

Another object of the present invention is to provide for the treatment of pyrolysis fuel oils in a manner such that the pyrolysis fuel oils can be employed as a feedstock for the production of products of consistent quality.

A further object of the present invention is to provide a process for the production of needle coke and/or carbon black and/or electrode binder pitch from a pyrolysis fuel oil.

These and other objects of the present invention should be apparent from reading the following detailed description thereof.

In accordance with the present invention, there is provided a process for treating a pyrolysis fuel oil wherein sulfur is dissolved in the pyrolysis fuel oil followed by soaking the pyrolysis fuel oil at a temperature and pressure for a period of time sufficient to react the highly unsaturated compounds present in the pyrolysis fuel oil, with the soaked pyrolysis fuel oil being further heated in a heating zone at a temperature of from about 850° F. to about 1100° F. and an outlet pressure of from about 300 to about 600 psig to reduce the API gravity and provide a treated feed having an API gravity of $-3°$ or less, preferably $-5°$ or less, with the API gravity generally being in the order of $-3°$ to $-10°$, preferably $-5°$ to $-10°$. The thus treated pyrolysis fuel oil may then be employed for the production of coke and/or carbon black and/or carbon electrode binder pitch, and the products resulting from such a feedstock have a consistent quality.

While Applicants do not wish to be bound by any particular theory as to the reasons why the process of this invention produces the desired results, it appears, based on observation and experience, that the heating step, which follows the soaking in the presence of sulfur, results in an increase in the aromaticity of the feedstock, which in turn favors the production of coke having a low CTE and associated good electrode-conductor properties, or, alternatively, of a high quality of carbon black, or, alternatively, a high grade of electrode binder pitch. With respect to delayed coking, the preferred feed procedure for producing the delayed coke, subsequent to treatment of the feedstock is that set forth in U.S. Pat. No. 3,687,840 which is hereby incorporated by reference.

The feedstock which is treated in accordance with the present invention is a pyrolysis fuel oil. Pyrolysis fuel oils are the residual heavy black oils boiling above pyrolysis gasoline; i.e., boiling above 375° to about 425° F., which are produced together with olefins in the pyrolysis of liquid hydrocarbon feedstocks. The pyrolysis fuel oil feedstocks generally have an API gravity in the order of from $-4°$ to $+5°$, most generally in the order of 0° to $+5°$. Such residual oils are well known and are described, for example, in U.S. Pat. No. 3,326,796 and No. 3,451,921, and in the patents and publications referred to in said patents.

In carrying out the process of the present invention, sulfur is incorporated into the feedstock prior to delivery of the pyrolysis fuel oil into a soaking tank. The sulfur can be added to the pyrolysis fuel oil in the form of elemental sulfur or in the form of a suitable organic sulfur compound such as a mercaptan. In whatever form it is employed, the quantity employed must be sufficient so that sulfur is present in the pyrolysis fuel oil in an amount not less than about 30 parts per million and preferably in the range of from about 100 to 200 ppm.

In order to facilitate the solution of elemental sulfur in the oil, it is desirable to add the sulfur to the oil at a temperature of from about 100° to about 300° F., preferably at from 150° to 200° F. Advantageously, this can be effected by dissolving sulfur in a slipstream and thereafter blending the resulting solution back into the feed.

The pyrolysis fuel oil is then passed to a soaking tank where it is subjected to a "soaking" treatment which comprises essentially the holding of the oil in a vessel at elevated temperature, for example, from about 450° to about 600° F., preferably at approximately 500° F. for a period between approximately 5 minutes and 120 minutes, and preferably between about 10 and 25 minutes. As noted above, the soaking treatment results in changes in the characteristics of the pyrolysis fuel oil among which is a significant decrease in its tendency to deposit coke and/or polymer in lines, heater or other equipment to cause plugging.

The above procedure is the procedure described in U.S. Pat. No. 3,687,840. The present invention differs from the procedure disclosed in the aforementioned patent, by adding a further heating step for modifying the characteristics of the pyrolysis fuel oil, prior to employing the pyrolysis fuel oil as a feedstock for the production of delayed coke, or carbon black or binder pitch.

In accordance with the present invention, the pyrolysis fuel oil which has been subjected to the soaking step is passed to a heating zone wherein the pyrolysis fuel oil is heated to a temperature of from about 850° F. to about 1100° F., preferably at a temperature of from about 900° to about 960° F. The outlet pressure employed in the heating zone is from about 300 to about 600 psig, preferably from about 350 to about 450 psig. The heating is effected to modify the characteristics of the pyrolysis fuel oil whereby the pyrolysis fuel oil, in a subsequent operation, will produce a consistent product. The determination of specific gravity or of the viscosity provides a suitable indication of the conversion of the pyrolysis fuel oil to a feedstock of the desired quality. In accordance with the present invention, as hereinabove noted, the heat treatment is effected to reduce the API gravity (generally the reduction is at least 1° or 2° or more) and provide a treated pyrolysis fuel oil having an API gravity of preferably less than about −5°. The API gravity is based on the material boiling above 500° F. Another convenient manner of measuring the characteristics of the treated pyrolysis fuel oil is the "Bureau of Mines Correlation Index" (BMCI). The BMCI values of the treated pyrolysis fuel oil feedstock should be at least 133, and preferably at least 140, which corresponds to the aforementioned API gravities. In general, the heat treatment is effected over a period of from about 8 seconds to about 110 seconds, preferably from about 15 to about 70 seconds. The chosen temperature, pressure and residence time of the heating are coordinated with the characteristics of the feedstock in order to provide a treated pyrolysis oil feedstock having the aforementioned API gravity or BMCI value.

The thus treated pyrolysis fuel oil may then be employed for the production of coke and/or the production of carbon black and/or the production of electrode binder pitch by procedures generally known in the art.

Figure 2:
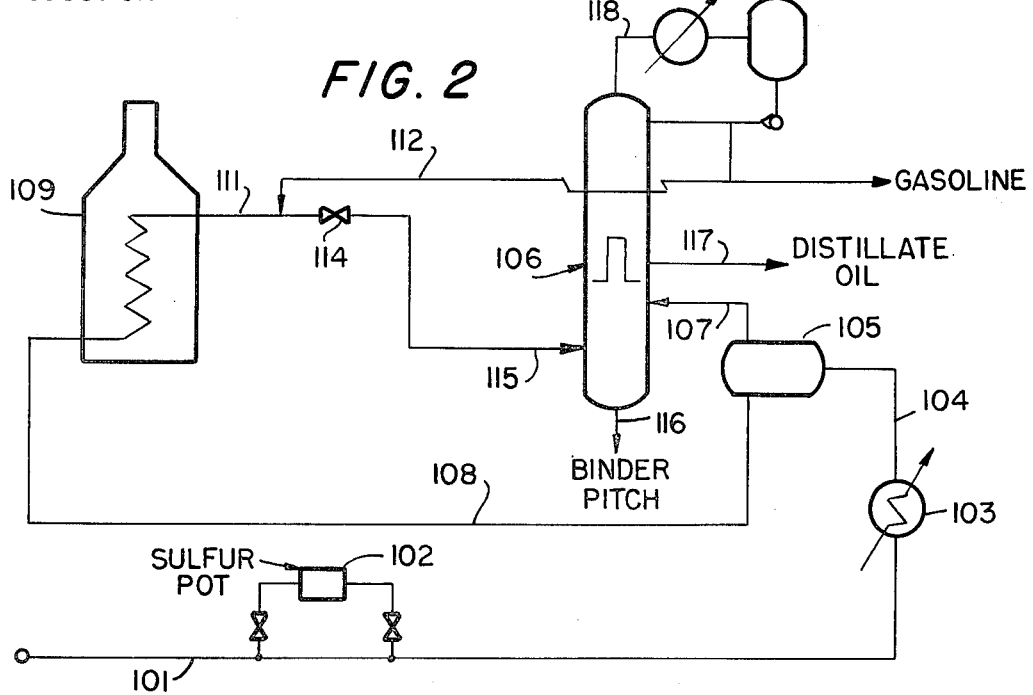

The invention will be further described with respect to the preferred embodiments thereof illustrated in the accompanying drawings, wherein:

FIG. 1 is a simplified schematic embodiment of the present invention combined with the production of coke; and FIG. 2 is a simplified schematic embodiment of the present invention incorporated into a process for producing electrode binder pitch.

Referring now to FIG. 1, a pyrolysis fuel oil, such as the heavy high boiling fraction obtained in the cracking of petroleum distillates in the presence of steam to produce olefins, is introduced into the unit through line 10. A slipstream of the feed is passed through a pot 2 containing elemental sulfur wherein sufficient sulfur is dissolved in the slipstream so that upon blending with the main stream, the sulfur content will be from about 30 to about 200 ppm. The sulfur containing pyrolysis fuel oil is then passed through heat exchanger 11 to effect heating thereof by indirect heat transfer with a heavy oil fraction, and through line 13 into soaking drum 4 wherein the pyrolysis fuel oil is treated at the conditions hereinabove described. Vapor from the soaking drum 4 passes into the fractionator 12 through line 3.

The liquid from soaking drum 4 is withdrawn through line 5 and introduced under pressure (for example, by a pump, not shown) into a heater 15 wherein the liquid is heated at the temperatures and pressures hereinabove described to produce a treated pyrolysis fuel oil having the hereinabove described characteristics.

The treated fuel oil is withdrawn from the heater 15 through line 6 and is cooled to a temperature in the order of from about 500° F. to about 750° F., preferably from about 550° F. to about 700° F., by direct quenching with a pressurized bottoms in line 18 obtained from fractionator 12. The cooled combined stream is then depressurized to a pressure in the order of from about 10 psig to about 100 psig, preferably from about 25 psig to about 40 psig (a pressure essentially that prevailing in the fractionating tower), by passage through a control valve 7 and introduced into a flash tank 16 to separate material boiling below about 550° F. The flash vapor is introduced into the fractionating tower 12 through line 8.

Liquid comprising the treated pyrolysis fuel oil having the hereinbelow described characteristics, is withdrawn from flash tank 16 through line 9 and combined with the portion of the bottoms from fractionator 12 not employed for quenching of the pyrolysis fuel oil withdrawn from furnace 15. The combined stream in line 17 is passed through the coil of delayed coking heater 15, operated so as to produce an outlet temperature of from about 840° to about 950° F., preferably at a temperature of from about 850° to about 900° F., and at an outlet pressure of from about 75 to 150 psig, preferably from about 90 to about 130 psig.

Vapor is withdrawn from the coke drums through line 21 and introduced into the fractionator 12, wherein as known in the art, the vapor is fractionated to provide an overhead of gasoline and lighter components, light gas oil, heavy gas oil and a bottoms, which is employed as recycle. The operation of a coker combination fractionating tower is well known in the art and no further details in this respect is deemed necessary for a complete understanding of the present invention.

As hereinabove described, a portion of the recycle, withdrawn as bottoms from the coker combination fractionator 12, is employed in line 23 for quenching the treated pyrolysis fuel oil. As should be apparent, line 23 would include a pump in order to pressurize this portion of the bottoms to the pressure of the treated pyrolysis fuel oil in line 6. The remaining portion of the bottoms is recycled to the coking operation through line 24, as hereinabove described.

It should be apparent that although the present invention has been described with respect to the embodiment specifically disclosed with respect to FIG. 1, the specific embodiment may be modified within the spirit and scope of the present invention. Thus, for example, although the embodiment has been particularly described with respect to the preferred operation of cooling the treated pyrolysis fuel oil by direct quenching, such cooling could be effected other than as particularly described; e.g., by indirect heat transfer. Similarly, although the embodiment has been specifically described with respect to effecting the cooling prior to the depressurization, it should be apparent that the cooling could be effected subsequent to depressurization. In such an embodiment, it would not be necessary to pressurize the portion of the bottoms from the fractionator which is employed for the direct contact quench cooling.

In accordance with another aspect of the present invention, the treated pyrolysis fuel oil is employed for the production of electrode binder pitch. In accordance with this aspect of the present invention, the treated fuel oil is fractionated to recover a pitch residue.

Referring now to FIG. 2, a pyrolysis fuel oil, such as the heavy high boiling fraction obtained in the cracking of petroleum distillates in the presence of steam to produce olefins, is introduced into the unit through line 101. A slipstream of the feed is passed through a pot 102 containing elemental sulfur wherein sufficient sulfur is dissolved in the slipstream so that upon blending with the main stream, the sulfur content will be from about 30 to about 200 ppm. The sulfur containing pyrolysis fuel oil is then passed through heat exchanger 103 to effect heating thereof, with the heated oil in line 104 being introduced into soaking drum 105 wherein the pyrolysis fuel oil is treated at the conditions hereinabove described. Vapor from the soaking drum 105 passes into the sractionator 106 through line 107. The liquid from soaking drum 105 is withdrawn through line 108 and introduced under pressure (for example, by a pump, not show into a heater 109 wherein the liquid is heated at the temperatures and pressures hereinabove described to produce a treated pyrolysis fuel oil having the hereinabove described characteristics.

The treated fuel oil is withdrawn from the heater 109 through line 111 and is cooled to a temperature in the order of from about 500° F. to about 750° F., preferably from about 550° F. to about 700° F., by direct quenching with a pressurized stream in line 112; in particular, gasoline, obtained from fractionator 106. The cooled combined stream is then depressurized to a pressure in the order of from about 10 psig to about 100 psig, preferably from about 25 psig to about 40 psig (a pressure essentially that prevailing in the fractionating tower), by passage through a control valve 114 and introduced into the fractionating tower 106 through line 115.

The fractionator 106 is operated to recover binder pitch as bottoms through line 116; a distillate oil sidestream through line 117; and gasoline and gas overhead through line 118. A portion of the gasoline recovered from the overhead is pressurized and employed in line 112 to effect quenching of the effluent from heater 109.

As hereinabove noted with respect to the embodiment of FIG. 1, the embodiment described with reference to FIG. 2 may also be modified within the spirit and scope of the present invention. Thus, the heated effluent from heater 109 could be cooled in a manner other than as described; e.g., by indirect heat transfer, or by quenching subsequent to depressurization.

In accordance with the aspect of the present invention wherein the pyrolysis fuel oil is to be employed for the production of carbon black, the treated pyrolysis fuel oil; i.e., subsequent to sequential soaking and heating thereof, is fractionated to recover an intermediate fraction low in asphaltenes which is converted to carbon black by procedures known in the art.

The present invention will be further described with respect to the following examples; however, it is to be understood that the scope of the invention is not to be limited thereby.

EXAMPLE 1

A pyrolysis fuel oil derived from steam-cracking of naphtha for the production of olefins, having 53.5 weight percent liquid boiling above 490° F. which has a specific gravity at 60°/60° F. of 1.1074 (−3.7 API), a BMCI of 130 and a Saybolt Universal viscosity at 210° F. of 305.3 seconds, having 25-50 parts per million, as elemental sulfur added thereto, was charged to a soaking drum and held there at a temperature of about 500° F. for a period of about 15 minutes. The lighter boiling liquid was drawn off as a vapor and the higher boiling liquid, after the 15 minute soaking period, was pumped to a furnace and heated to a temperature of about 900° F. for a period of 17 seconds and left the heater under a pressure of 350 psig. The leaving liquid was combined with the condensed vapors from the soaking drum and quenched, reduced in pressure and passed to a flash tank where lighter materials present were removed as vapor or gas. The liquid remaining after the removal of the lighter materials produced a 99.6% yield based on the original charge. The liquid from three separate runs was then blended and contained 51.4 weight percent material boiling above 500° F. with a specific gravity at 60°/60° F. of 1.1196 (−5.12 API), a BMCI of 138 and a S.U.S. viscosity at 210° F. of 189.2. The quality of the liquid was uniform throughout and the change in specific gravity and viscosity indicated a change in the nature of the pyrolysis fuel oil.

EXAMPLE 2

A portion of the liquid product from Example 1 was employed as a feedstock in a delayed coking procedure as described in U.S. Pat. No. 3,687,840. The coke drum temperature was about 850° F. and the pressure used about 90 psig. Needle coke was produced.

Graphitized electrodes made from the needle coke of this example have a coefficient of thermal expansion parallel to the grain of $0.62 \times 10^{-6}/°$ C. and a resistivity of $32.6 \times 10^{-5}$ ohm inches.

Graphitized electrodes made from a coke produced from the same pyrolysis fuel oil not treated in accordance with the present invention have a longitudinal coefficient of thermal expansion of $1.61 \times 10^{-6}/°$ C. and a resistivity of $52 \times 10^{-5}$ ohm inches, and, hence, are significantly inferior.

EXAMPLE 3

A pyrolysis fuel oil having 25-50 parts per million, as elemental sulfur, added thereto was charged to a soaking tank and held there at a temperature of about 500° F. for a period of about 15 minutes. The lighter boiling liquid was drawn off as a vapor, and the higher boiling liquid, after the 15 minute soaking period, was pumped to a furnace and heated to a temperature of about 900° F. for a period of 17 seconds and an outlet pressure of 350 psig. After cooling and pressure reduction followed by flashing of lighter materials, the liquid remaining, comprising a 99.6% yield, based on the original charge, was distilled leaving a residue of 31.4 weight percent having the following properties:

| | |
|---|---|
| Gravity, °API | −9.43 |
| Softening Point, °F. | 223 |
| Viscosity, | |
| Saybolt Furol, sec. at 360° F. | 311 |
| Saybolt Furol, sec. at 400° F. | 61.5 |

Distillation of a pyrolysis of fuel oil, without treatment as hereinabove described, will leave a residue or pitch of 34.7 weight percent resulted in a pitch having the following properties:

| | |
|---|---|
| Gravity, °API | −6.68 |
| Softening Point, °F. | 232 |
| Viscosity | |
| Saybolt Furol, sec. at 300° F. | 2122 |
| Saybolt Furol, sec. at 350° F. | 440 |
| Saybolt Furol, sec. at 400° F. (extrapolated) | 105 |

A comparison of the pitches indicates that the pitch produced in accordance with the present invention has an increased aromaticity, as evidenced by a lower API gravity and a lower viscosity.

Numerous modifications and variations of the present invention are possible in light of the above teachings and, therefore, within the scope of the appended claims, the invention may be practiced otherwise than as particularly described.

What is claimed is:

1. A process for treating pyrolysis fuel oil boiling above about 375° F. to 425° F. comprising:

adding sulphur to the pyrolysis fuel oil to provide dissolved sulphur in the pyrolysis fuel oil in an amount of not less than 30 part per million;

soaking the pyrolysis fuel oil at a temperature of from 450° F. to 600° F. to polymerize the highly unsaturated compounds present in said oil;

reducing the API gravity of the pyrolysis fuel oil by at least 1° based on the material boiling above 500° F. to provide a treated pyrolysis fuel oil having an API gravity of no greater than −3° based on the material boiling above 500° F., said reducing being effected by heating the soaked pyrolysis fuel oil in a heating zone to a temperature of from 850° F. to 1100° F. at an outlet pressure of from 300–600 psig and for a residence time to effect said reducing of API gravity; and recovering the treated pyrolysis fuel oil.

2. The process of claim 1 wherein said heating to reduce the API gravity is effected for a time of from about 8 to about 110 seconds.

3. The process of claim 2 wherein said soaking is effected for a period of from 5 minutes to 120 minutes.

4. The process of claim 1 wherein said heating to reduce the API gravity is effected at a temperature of from 900° F. to 960° F.

5. The process of claim 4 wherein the outlet pressure in the heating zone is from 350–450 psig.

6. The process of claim 1 and further comprising heating at least a portion of said treated pyrolysis fuel oil to coking temperature and delay coking said heated portion of the treated pyrolysis fuel oil.

7. The process of claim 1 and further comprising distilling recovered treated pyrolysis fuel oil to separate distillates therefrom and provide a pitch residue.

8. The process of claim 1 wherein at least a portion of the recovered treated pyrolysis fuel oil is employed to produce carbon black.

9. The process of claim 5 wherein the treated pyrolysis fuel oil has an API gravity of less than about −5°.

10. The process of claim 1 wherein said heating is effected as a continuous operation iin a heating coil.

11. The process of claim 10 wherein at least a portion of the treated pyrolysis fuel oil is heated to coking temperature and delay coking said heated portion of the treated pyrolysis fuel oil.

12. The process of claim 1 wherein the treated pyrolysis fuel oil subsequent to the heating is cooled and depressurized to provide a treated pyrolysis fuel oil at a pressure of from 10–100 psig and a temperature of from 500° F. to 750° F.

* * * * *